United States Patent [19]

Reunamäki et al.

[11] Patent Number: 5,057,137
[45] Date of Patent: * Oct. 15, 1991

[54] METHOD OF AND APPARATUS FOR BENDING AND TEMPERING GLASS SHEETS

[75] Inventors: Pauli T. Reunamäki; Jouko K. Järvinen, both of Tampere, Finland

[73] Assignee: O/Y Kyro A/B Tamglass, Tampere, Finland

[*] Notice: The portion of the term of this patent subsequent to Nov. 21, 2006 has been disclaimed.

[21] Appl. No.: 403,496

[22] Filed: Sep. 6, 1989

Related U.S. Application Data

[63] Continuation of Ser. No. 99,722, Sep. 22, 1987, Pat. No. 4,881,962.

[30] Foreign Application Priority Data

Sep. 22, 1986 [FI] Finland ................................ 863826

[51] Int. Cl.⁵ ............................................ C03B 23/023
[52] U.S. Cl. ........................................ 65/104; 65/106
[58] Field of Search ................. 65/104, 106, 107, 273, 65/289

[56] References Cited

U.S. PATENT DOCUMENTS

| | | | |
|---|---|---|---|
| 2,223,124 | 11/1940 | Owen | 65/289 |
| 2,677,918 | 5/1954 | Bird et al. | |
| 3,361,552 | 1/1968 | Ritter, Jr. | 65/106 |
| 3,529,947 | 9/1970 | Frank | 65/104 |
| 3,545,951 | 12/1970 | Nedelec | 65/104 |
| 4,123,246 | 10/1978 | Johnson | 65/104 |
| 4,139,359 | 2/1979 | Johnson et al. | 65/107 |
| 4,381,933 | 5/1983 | Schultz et al. | 65/106 |
| 4,540,425 | 9/1985 | Bocelli et al. | 65/107 |
| 4,540,426 | 9/1985 | Bocelli et al. | 65/104 |
| 4,773,925 | 9/1988 | Schultz | 65/107 |
| 4,784,681 | 11/1988 | McMaster | 65/273 |
| 4,822,398 | 4/1989 | McMaster et al. | 65/273 |

FOREIGN PATENT DOCUMENTS 0154892 1/1988 European Pat. Off. .
3525451 2/1987 Fed. Rep. of Germany .
4321654 10/1963 Japan .

*Primary Examiner*—Joye L. Woodard
*Attorney, Agent, or Firm*—Burns, Doane, Swecker & Mathis

[57] ABSTRACT

A glass bending and tempering apparatus including a bending and tempering section, a deformable glass support device and a device for quenching a glass sheet is disclosed. The deformable glass support device is deformable from a substantially flat configuration to a configuration having a desired curvature. The device for quenching a glass sheet is conformable to the curvature of the support device during deformation of the support device. The apparatus also includes a mechanism for blowing air that is vertically movable relative to the support device.

19 Claims, 6 Drawing Sheets

METHOD OF AND APPARATUS FOR BENDING AND TEMPERING GLASS SHEETS

This application is a continuation of application Ser. No. 099,722, filed Sept. 22, 1987, now U.S. Pat. No. 4,881,962.

The present invention relates to a method of bending a glass sheet to be tempered, comprising the steps of carrying a glass sheet on horizontal rollers heating a glass sheet for bending and tempering curving a heated glass sheet around an axis of curvature that is transversal to the direction of movement effecting the tempering of a curved glass sheet.

The invention relates also to a glass sheets bending and tempering apparatus, comprising a loading station, a heating furnace, a bending and tempering section and an unloading station, heating means in said furnace for heating the glass sheets, chilling means in said bending and tempering section for annealing a bent glass sheet, roller conveyors consisting of horizontal rollers for carrying glass sheets from loading station to unloading station through the bending and tempering section of said furnace, drive means for operating the roller conveyors adapted to drive in an oscillating fashion at least the roller conveyor in said bending and tempering section.

Bent and tempered glass sheets are particularly used for vehicle glazings For example, automobile side windows are made almost without exception of unidirectionally bent and tempered glass sheets.

U.S. Pat. No. 3,545,951 discloses an apparatus for bending glass sheets around an axis of curvature extending in the direction of movement by employing curved bending rolls. By selecting an appropriate bending angle for the rolls, the bending can be effected gradually from flat to the final curvature. However, the bending effected around an axis of curvature extending in the direction of movement does not produce optically high-quality bent glass. The reason for this is that the rolls impart a slight corrugation to glass in the direction of the axis of curvature. Since this slight corrugation produced by the rolls appears in the direction in which a glass sheet should be perfectly flat, the corrugation will be optically visible no matter how slight it is. On the other hand, if a glass sheet is bent around an axis transverse to the direction of movement, a corrugation caused by the rolls is parallel to the curvature. As the corrugation in this case leads to an extremely slight variation of curvature in a surface that is curved anyway, such corrugation cannot be optically detected nearly as easily as in glass sheets that are bent by means of curved rolls around an axis extending in the direction of movement.

U.S. Pat. Nos. 4,540,425 and 4,540,426 disclose the bending of glass sheets around an axis of curvature transverse to the conveying direction by using a section of conveyor track curved downwards or upwards, the bending being effected as the glass sheets are passing between the pairs of rollers which make up said curved track. A drawback in this system is that, in one point at the forward end of said track, the bending occurs quickly whereafter, over the rest of a curved track, there will be no bending but instead just maintaining the bent configuration. A drawback in this arrangement is that a bending effected quickly at one point requires a relatively higher glass temperature so as not to break the glass sheet. A higher temperature always leads to the softening of glass resulting in the increased corrugation of glass and in the deterioration of optical quality.

If, instead, each point in a glass sheet can be curved simultaneously at the same speed, the bending can be effected at a substantially lower temperature and thus it is possible to avoid the extra increase in glass temperature, which is required by an excessively high bending rate and which increases corrugation and so impairs the optical quality of glass. Prior to the present invention, this has not been possible when bending glass sheets around an axis of curvature transverse to the traveling direction.

Another problem associated with the prior art set forth in U.S. Pat. Nos. 4,540,425 and 4,540,426 is that the direction of a curved track diverges over the entire track length from its upstream to its downstream end more and more from the horizontal plane, whereby the angle of the downstream end of a track relative to the horizontal plane will be great. Thus, it is not possible to bend a glass sheet with a small bending radius since, e.g. with an upwards-directed arch, a glass sheet begins to slip on conveyor rollers. In addition, this construction results in the total disappearance of the continuity of a conveying track at the downstream or trailing end of a curved track section. Carrying a curved glass sheet over this transition point is problematic. This prior art apparatus is a continuous-action machine, i.e. the feeding of glass sheets is effected continuously in one direction with a consequence that the bending and chilling section will be relatively long. There will also be a large number of rollers, considering the upper and lower rollers Thus, the apparatus will also be expensive.

U.S. Pat. Nos. 4,123,246 and 4,139,359 disclose an apparatus for bending glass sheets in two directions, i.e. around an axis parallel to the traveling direction by using a longitudinally variable roller diameter and around an axis transverse to the traveling direction by using a curved or arched conveying track. In this prior art system the mid- and end sections of the rollers have different peripheral speeds, which leaves marks on the glass surface. In its longitudinal direction, the conveying track has a predetermined, fixed curvature and the curved track section begins immediately downstream of a furnace and continues all the way to a post-chilling section. Between a tempering section and a furnace is provided a relatively long curved track section, serving as the actual bending section, wherethrough the continuously and nonstop advanced glass sheets move to annealing. In this system, a curved track section is very long and it has a precisely predetermined, fixed radius of curvature. The flat glass sheets are carried over onto the curved track section by means of a pivotable, flat intermediate conveyor, upon which a glass sheet is first moved and by turning it a glass sheet can be laid upon the curved track section. When a flat glass sheet is suddenly moved over upon a curved conveyor, the sheet will only be supported by its edges and thus it bends uncontrollably over its mid-section towards the rollers. Susceptibility to breakage and risk of optical defects are imminent.

U.S. Pat. No. 4,381,933 proposes to solve this problem of bending around an axis of curvature parallel to the traveling direction by providing the intermediate conveyor with curved rollers, between which a glass sheet gradually bends around an axis of curvature parallel to traveling direction as it approaches the actual bending rolls. However, the curving around a transverse axis of curvature still proceeds uncontrollably and is even further complicated by the fact that initial arching in one bending direction increases the rigidity of glass in the other bending direction. Another drawback is that the rollers at the upstream end of a curved track section and the intermediate conveyor rollers must be able to pass between each other, whereby the rollers must be positioned relatively far from each other within the section where the temperature of a glass sheet emerging from the furnace is at its highest. This leads to an imminent danger of glass sheets hanging between the rollers, resulting in optically visible corrugation in the end product.

An object of this invention is to provide a method of and an apparatus for bending and tempering glass sheets such that glass sheets can be bent around an axis of curvature transverse to traveling direction in a totally controlled fashion in a manner that each point in a glass sheet curves practically at the same rate simultaneously over the entire area of glass.

Another object of the invention is to provide a method and an apparatus, whereby the final radius of curvature of glass can be adjusted with high speed and accuracy.

A third object of the invention is to provide a method and an apparatus, wherein it is possible to attain a very small radius of curvature despite an axis of curvature transverse to traveling direction.

A fourth object of the invention is to provide a method and an apparatus, whereby a glass sheet can be curved while at the same time moving it back and forth so as to make the length of a bending and tempering section as short as possible.

A fifth object of the invention is to provide a method and an apparatus, wherein mechanical-contact bending press means above a glass sheet are not required at all.

A sixth object of the invention is to provide a method and an apparatus for bringing a glass sheet from furnace to bending and tempering section at such a low temperature that it is not sufficient for gravitational bending of a glass sheet without further heating and/or increasing the bending force.

All these objects are achieved by the invention on the basis of the characterizing features set forth in the annexed claims.

One embodiment of the invention will now be described in more detail with reference made to the accompanying drawings, in which FIG. 1 is a diagrammatic side view of a complete bending and tempering assembly This invention relates to a bending and tempering section 3.

Figure 1:
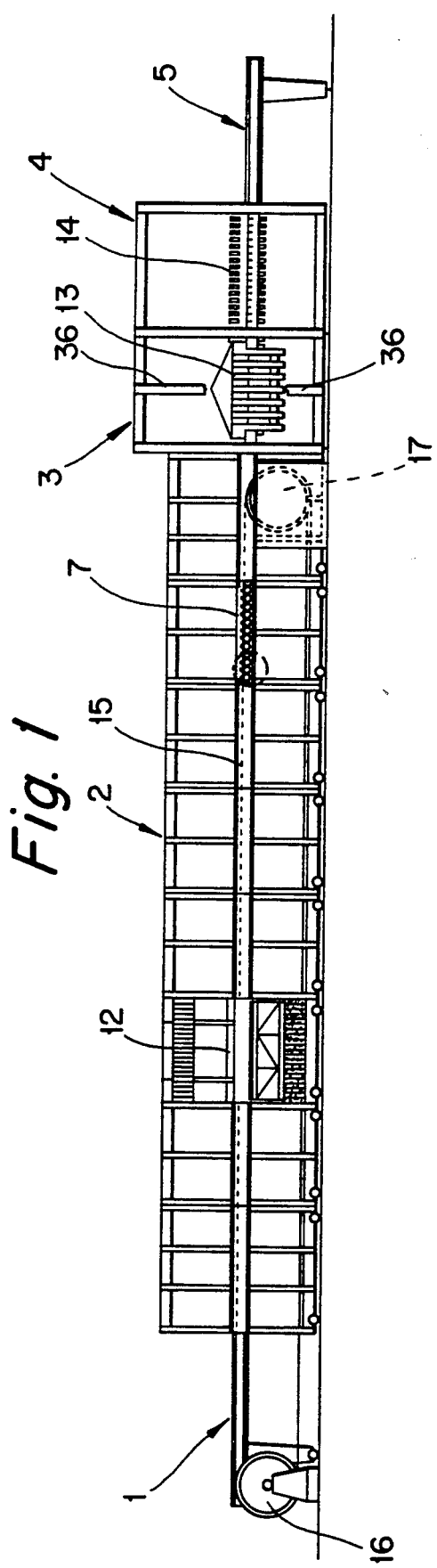
FIG. 1A is an enlarged view of a segment of the assembly of FIG. 1.

First a brief description of the design and operation of the entire apparatus.

The apparatus comprises a loading section 1, a heating furnace 2, a bending and tempering section 3, a postchilling or annealing section 4 and an unloading section 5. Each section and the heating furnace are provided with conveyors consisting of horizontal rollers extending crosswise to the traveling direction, namely a loading section conveyor 6, a furnace conveyor 7, an intermediate conveyor 8 at the downstream end of the furnace, a bending and tempering section conveyor 9, an annealing section conveyor 10 and an unloading section conveyor 11.

The furnace is provided with heating resistances 12, the bending and tempering section is provided with cooling-air blowing means 13 and the annealing section is provided with less effective cooling-air blowing means 14.

A motor M1 drives the furnace conveyor 7 in an oscillating fashion e.g. in a manner that one of the forward-directed oscillating strokes is longer than a return stroke preceding or following it. Advancing the loads of glass sheets in the furnace is thus effected gradually and intermittently during these long oscillating strokes. Thus, the furnace contains successively and as close to each other as possible a plurality of different loads of glass sheets, each in different stage of heating.

Figure 1A:
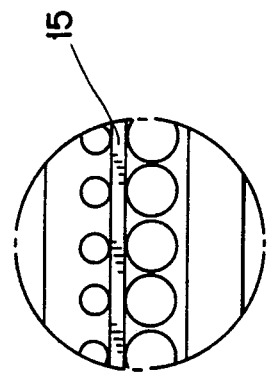
Figure 2:
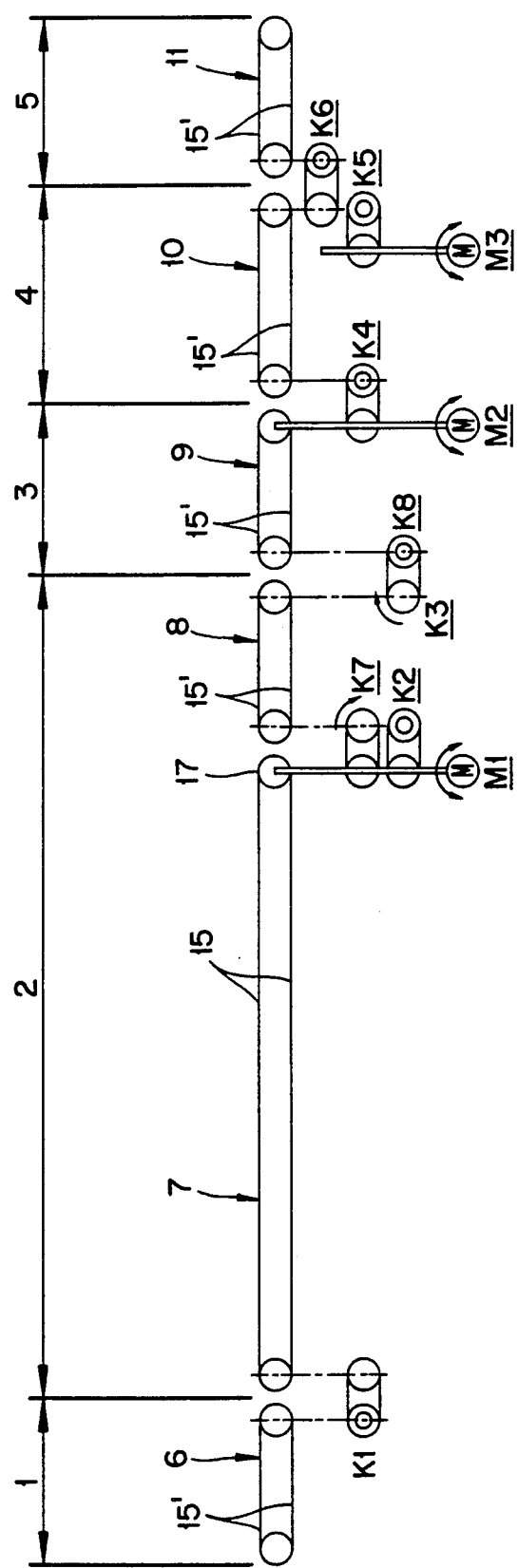
FIG. 2 is a diagrammatic view of the conveyors and their drive means for the entire assembly.

The other ends of furnace conveyor 7 emerge from one side of the furnace and are fitted with pulleys, against which press wheels squeeze a steel belt 15 trained as an endless loop over reversing wheels 16 and 17 (see FIGS. 1 and 1A). Motor M1 drives reversing wheel 17.

The drive of other conveyors 6, 8 to 11 can be effected by means of endless chains 15', meshing with sprocket wheels at the ends of conveyor rollers.

A motor M2 drives said conveyor 9 of bending and tempering section 3 in an oscillating fashion, so that a load of glass sheets reciprocates in the bending and tempering section the same distance forward and backward. A motor M3 drives said annealing section conveyor 10 also in an oscillating fashion.

When furnace conveyor 7 effects a long forward stroke, a switch K1 is shut and a fresh load of glass sheets moves over from loading conveyor 6 onto furnace conveyor 7.

Towards the end of a forward oscillating stroke of furnace conveyor 7, a switch K2 is opened and a switch K8 is closed, said intermediate conveyor 8 traveling along with conveyor 7 or 9 through the intermediary of power transmission means K7 or K3, depending on which conveyor 7 or 9 has greater speed. At first, the speed of conveyor 7 exceeds that of conveyor 9, but the speed of conveyor 7 decelerates and that of conveyor 9 accelerates, whereby at a certain instant the speeds are equal and thereafter the drive of intermediate conveyor 8 shifts over to conveyor 9. Conveyors 8 and 9 are driven by motor M2 until a load of glass sheets advances onto said bending and tempering section conveyor 9. During this shift-over stroke, furnace conveyor 7 can reverse and start its return. During this shift-over stroke, a switch K4 is opened, whereby a motor M3 can be first used to drive conveyors 10 and 11 together for carrying a load of glass sheets from annealing section 4 to unloading section 5 and thereafter, with a switch K6 opened and a switch K5 closed, conveyor 10 can be oscillated and a load of glass sheets on conveyor 10 can be brought as close to conveyor 9 as possible prior to moving a bent and tempered glass sheet from conveyor 9 onto conveyor 10. During this shift, switches K4 and K6 are closed and switch K5 is open, said conveyors 9, 10 and 11 being coupled together and perform a long transfer stroke driven by motor M2.

Figure 3:
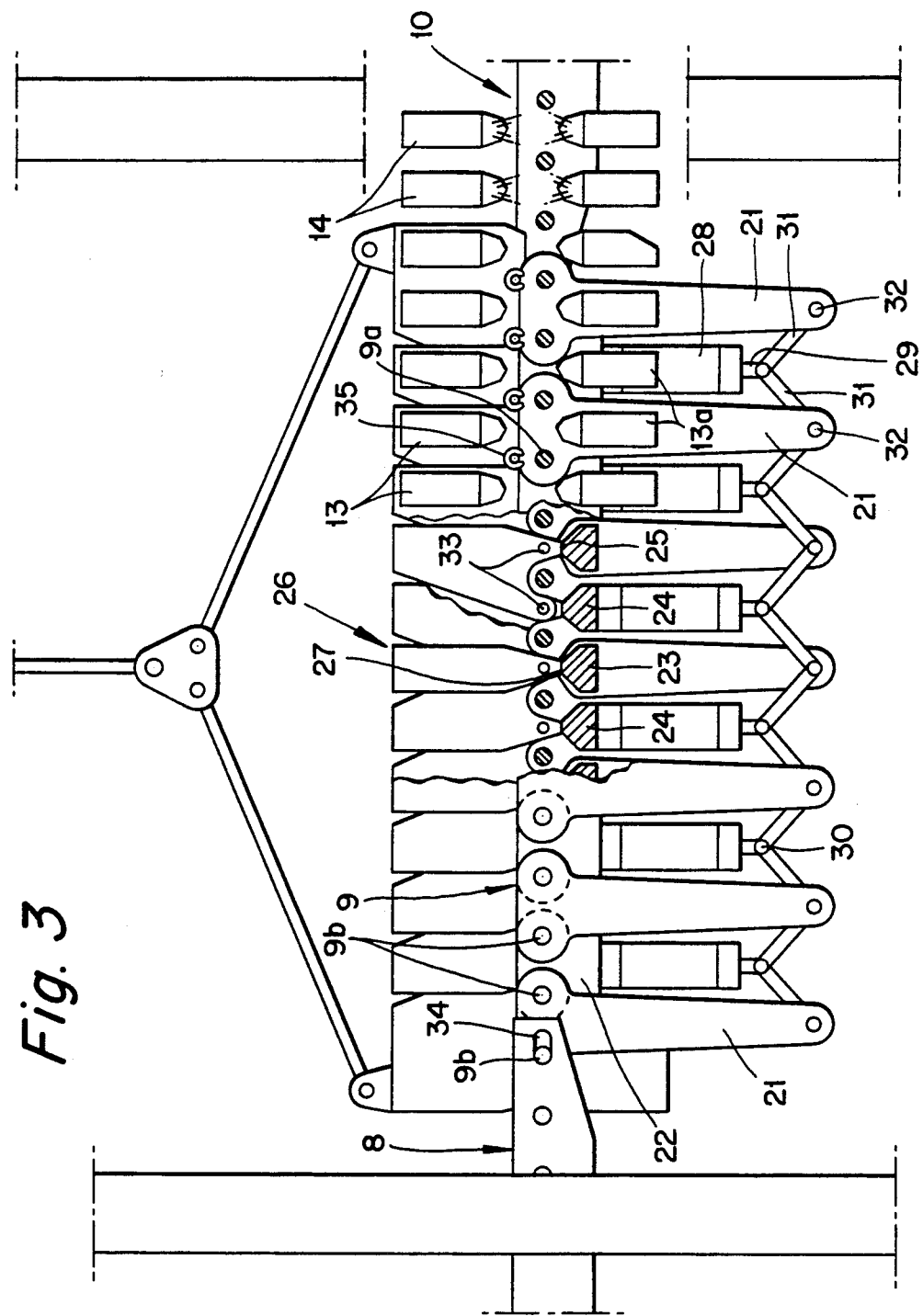
FIG. 3 is a more detailed view of the design of a bending and tempering section. The left-hand portion of the figure shows the structure in a side view and proceeding to the right, the figure shows the interior structures in sections taken on various levels.
Figure 4:
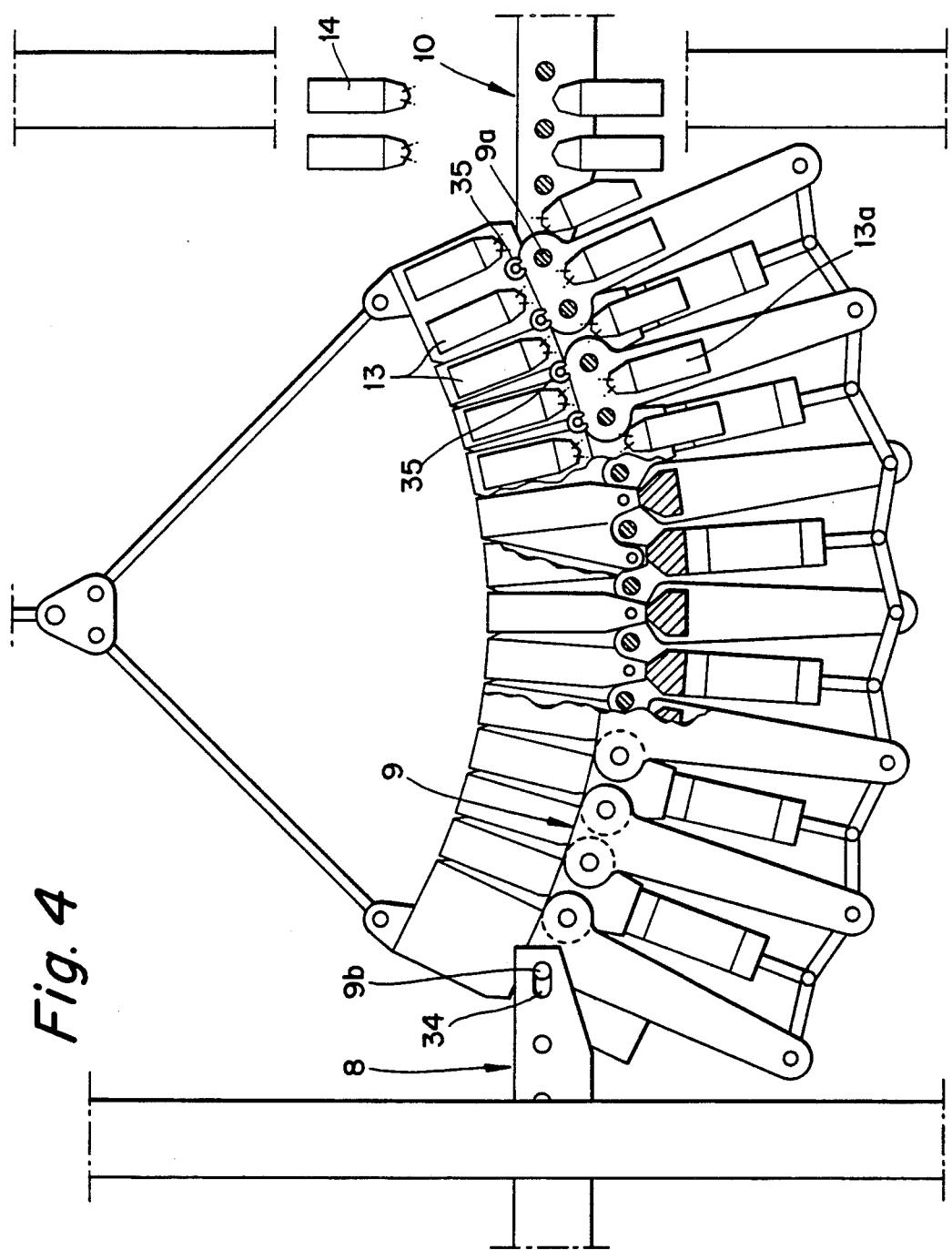
FIG. 4 shows the same as FIG. 3 but during a bending process.
Figure 5:
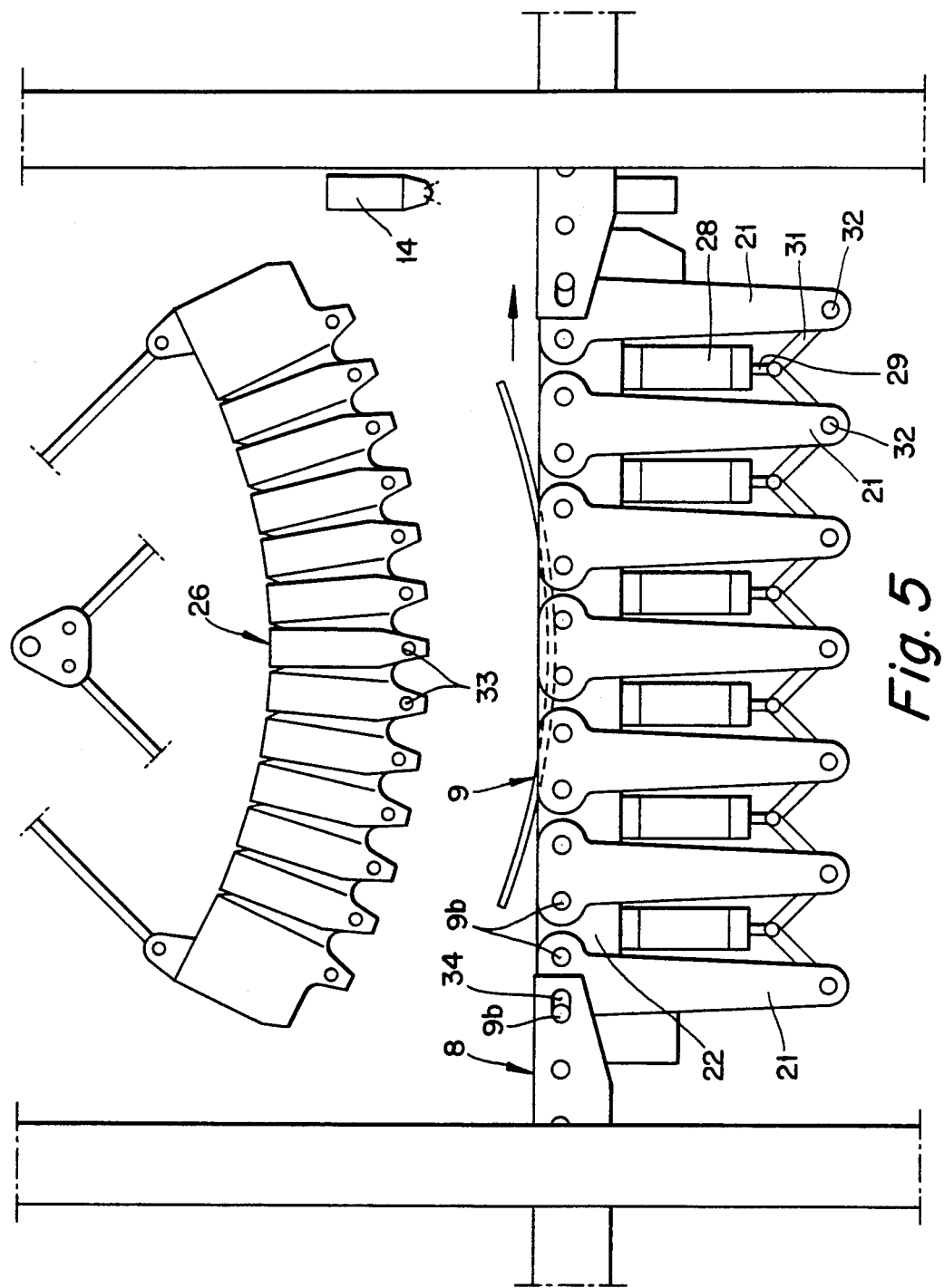
FIG. 5 shows a bending and tempering section after a bending process prior to carrying a bent glass sheet forward into a post-chilling section.

FIGS. 3 to 5 show the downstream end of intermediate conveyor 8 and the upstream end of annealing section 10, said bending and tempering section conveyor 9 being fitted therebetween.

Figure 6:
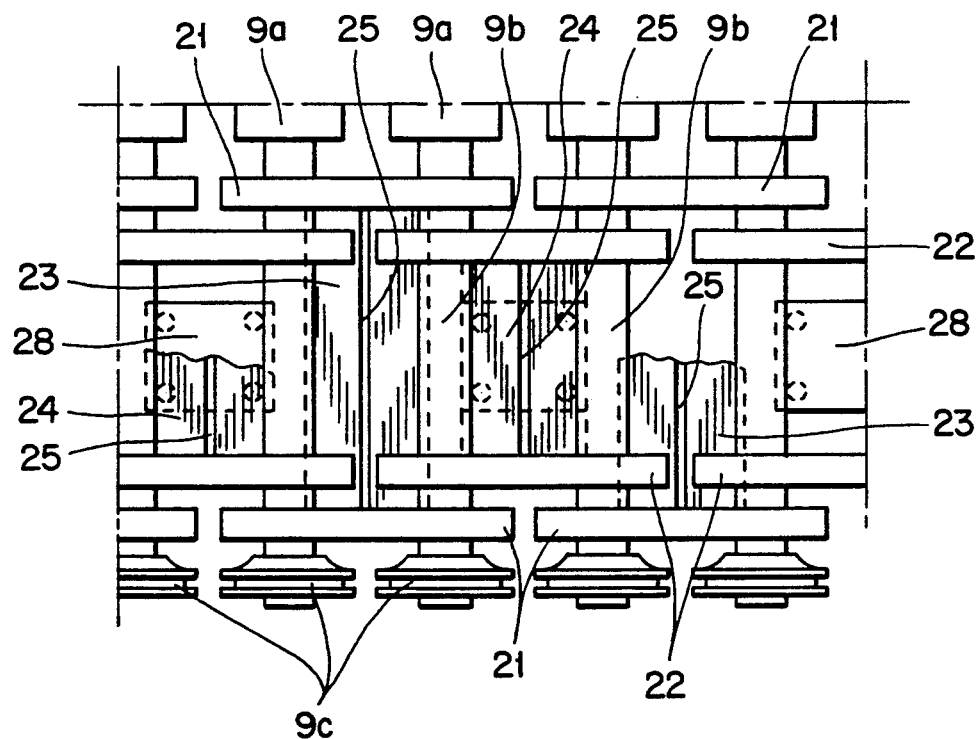
FIG. 6 is a plan view of a portion of one edge of a roller conveyor to be curved.

The construction of conveyor 9 is first explained with reference to FIGS. 3 and 6.

Projecting from the ends of conveyor rollers 9a are axle stubs 9b which link the upper ends of support members 21 and 22 pivotably together. Outer support members 21 and inner support members 22 build together with axle stubs 9b a flexible sprocket chain which is, however, flexible in a controlled fashion, as explained hereinbelow. The outer ends of axle stubs 9b are provided with sprocket wheels 9c for rotationally driving conveyor rollers 9a.

The outer support members 21 are mounted pairwise parallel to and spaced from each other and attached with horizontal support beams 23. The inner support members 22 are likewise mounted pairwise parallel to and spaced from each other and tied together with horizontal support beams 24. Support beams 23 and 24 have roof-like sloping top surfaces with a narrow support ridge 25 therebetween. The cooling-air nozzles 13 above the conveyor are provided with a flexible housing 26, resting with its bearing surfaces 27 upon support ridges 25.

The support beams 24 linking said inner pairs of support members 22 are provided with rigidly fitted cylinders 28, whose piston rods 29 are connected with a link 30 to lever arms 31 whose ends, in turn, are connected by pins 32 to the lower ends of outer pairs of support members 21.

Since the centre axes of symmetry of successive pairs of support members 21 and also those of pairs of support members 22 as well as their associated cylinders 28 are in a side view parallel, i.e. in this case vertical, the centre axes of rollers 9a lie in a horizontal plane and roller conveyor 9 is over its entire length in the same plane as conveyors 8 and 10. Thus, there is a substantial angle, e.g. 90°, between link arms 31.

The other ends of rollers 9a are supported with a similar structure.

When piston rods 29 of cylinders 28 are simultaneously extended through the same distance, the angle between levers 31 increases resulting in the increase of a distance between pins 32. However, the distances between axle stubs 9b remain unchanged and, hence, the assembly made up by support members 21 and 22 curves uniformly over its entire length.

FIG. 4 depicts the arched position of conveying track 9, obtained by varying the angles between support members 21 and 22 as explained above. What is essential in this arching of the track is that the upstream end of the track curves downwards, the tangent of track midportion is substantially horizontal and the downstream end of track rises upwards. Thus, the conveying track can be arched even with quite a small radius of curvature without making the angle of the downstream end of track relative to the horizontal plane too great. The track curvature can be quickly and accurately adjusted as desired by adjusting the extension of piston rods 29.

The direction of nozzles 13 above the conveyor always remains perpendicular to the conveyor tangent, since said housing 26 bends around pins 33, and rests upon support ridges 25, so as to bend or flex along with the conveyor.

The cooling-air blowing nozzles 13b that are fitted below the roller conveyor are mounted on beams, which extend below the conveyor and connect the pairs of support members 21 and 22 on either side of the conveyor, whereby also the centre line of nozzles 13a remains perpendicular to the tangent of a curved conveyor. Thus, the cooling effect remains uniform over the entire conveyor length regardless of its degree of curvature. In the present embodiment, the ends of a conveyor 9 to be arched have been kept in the same plane as the ends of conveyors 8 and 10. This is achieved in a manner that the axle stubs 9b of the end rollers of conveyor 9 are supported on the bearing frame of conveyors 8 and 10. Since the length of the array of rollers of conveyor 9 remains unchanged during the curving process, the frame of conveyors 8 and 10 is provided with horizontally elongated holes 34 for axle stub 9b.

The flexible structure of the support housing 26 of said cooling-air nozzles 13 is designed so as to allow the bending of housing 26 only to an arch corresponding to the maximum deflection of conveyor track 9. This renders it possible to pick up the entire housing 26 from conveyor 9, as shown in FIG. 5, whereby track 9 can be re-aligned in a horizontal plane prior to removing the bent and tempered glass from conveyor 9.

The cooling-air blowing nozzles 13 and 13a are positioned on opposite sides of the conveyor so that their centre lines coincide with spaces between the conveyor rollers.

Housing 26 is further fitted with hot-air blowing nozzles 35, located between nozzles 13 in register with the conveyor rollers.

The bending and tempering of glass sheets in a bending and tempering section 3 of the invention is effected as follows. Conveyor 9 and nozzle housing 26 are on top of each other as in FIG. 3 and in a flat plane with a glass sheet moving over from conveyor 8 onto conveyor 9. Immediately when the trailing edge of a glass sheet reaches conveyor 9, or slightly before that, the arching of conveyor 9 is begun. Simultaneously, nozzles 35 are operated to blow hot air to the upper surface of a glass sheet. This increases the pressure applied to said upper surface and retards the cooling rate of a glass sheet. Through the action of gravity and assisted by said blowing pressure applied to the upper surface, the arching of a glass sheet follows the arching of conveyor track 9 while, at the same time, a glass sheet advances towards the downstream end of conveyor track 9. The final curvature is generally attained even before conveyor 9 stops for a return stroke. If necessary, the conveyor arching and glass sheet bending can be continued even during a return stroke. As soon as the final curvature has been attained, hot-air blowing from nozzles 35 is stopped and cooling-air blowing from nozzles 13 and 13a is started to both surfaces of a glass sheet. Simultaneously, a glass sheet is oscillated back and forth on conveyor 9. The duration of a cooling-air blowing period is determined by the thickness of a glass sheet. When the cooldown blowing has been continued for a period sufficient for tempering a glass sheet, said nozzle housing 26 is picked up (FIG. 5) and conveyor track 9 is bent to horizontal level. Now, said conveyor track 9 is on the same level as the other track sections and a bent glass sheet can be carried over onto annealing section conveyor 10.

This is followed by re-lowering nozzle housing 26. Now, suitable vertical guides (a beam 36 in FIG. 1) are used to make sure that the central bearing surface 27 of housing 26 finds the central support ridge 25. Thereafter, the rest of the bearing surfaces find automatically their respective support ridges as housing 26 is being lowered until it rests upon conveyor 9.

The bending and tempering section is now ready to receive a fresh glass sheet for bending and tempering.

It is obvious that the above structural design is but one embodiment and a person skilled in the art can readily modify many structural details while applying the basic idea of the invention within the scope of the annexed claims. Thus, for example, the arching of a conveyor need not be effected by maintaining its ends on the initial level but just as well the midportion of a conveyor can be kept on the initial level, in which case the ends of a conveyor rise and fall relative to this fixed initial level. This arrangement works equally well because glass sheets are carried onto conveyor 9 or out of conveyor 9 as it is on a flat level. A bending and tempering section of the invention is useful in a variety of equipment, in which the design and operation of other sections can vary in a plurality of ways.

We claim:

1. A glass bending and tempering apparatus comprising:
   a bending and tempering section having an upstream end for receiving a heated glass sheet and a downstream end for exiting a bent glass sheet;
   a deformable glass support means disposed substantially horizontally between said upstream and downstream ends of said bending and tempering section, said support means being fixed at a center location of said upstream end of said bending and tempering section and a center location of said downstream end of said bending and tempering section, said centers of location being substantially fixed in a vertical direction, said support means being deformable from a substantially flat configuration to a configuration having a desired curvature, said support means remaining substantially fixed at said centers of location of said upstream and downstream ends during deformation;
   means for quenching a glass sheet in said bending and tempering section, said means for quenching being conformable to a curvature of said support means during deformation of said support means; and,
   means for blowing air disposed above said support means that is deformable into a configuration that conforms with the curvature of said support means, said means for blowing being mounted so as to be vertically movable relative to said support means such that said means for blowing is spaced in close proximity to said support means in a lowered position during bending of said glass sheet and said means for blowing is displaced from said support means in a raised position.

2. An apparatus as set forth in claim 1, wherein said means for blowing air includes a plurality of blowers that are movable relative to each other during deformation of said means for blowing air.

3. An apparatus as set forth in claim 1, wherein said means for quenching includes a plurality of blowers which are pivotally mounted relative to each other below a glass bearing surface of said support means.

4. An apparatus as set forth in claim 1, wherein said support means is deformable around an axis of curvature transverse to a traveling direction of said heated glass sheet.

5. A glass bending and tempering apparatus comprising:
   a bending and tempering section having an upstream end for receiving a heated glass sheet and a downstream end for exiting a bent glass sheet;
   a deformable glass support means disposed substantially horizontally between said upstream and downstream ends of said bending and tempering section, said support means being fixed at a center location of said upstream end of said bending and tempering section and a center location of said downstream end of said bending and tempering section, said centers of location being substantially fixed in a vertical direction, said support means being deformable from a substantially flat configuration to a configuration having a desired curvature, said support means remaining substantially fixed at said centers of location of said upstream and downstream ends during deformation;
   said support means being formed of a plurality of support members that are connected together by a plurality of lever arms; and,
   means for quenching a glass sheet in said bending and tempering section, said means for quenching being conformable to a curvature of said support means during deformation of said support means.

6. An apparatus as set forth in claim 5, wherein said support means includes a plurality of rollers for transporting a glass sheet, said rollers being supported by said support members, said support means extending in a traveling direction of said glass sheet and being curvable around an axis of curvature transverse to said traveling direction according to a variable angle between pairs of individual first and second support members, said variable angle being adjustable according to movement of said lever arms caused by actuation of power units.

7. An apparatus as set forth in claim 6, wherein each roller includes an axle stub extending from each end of said roller, an upper end of each individual first and second support receiving the axle stubs of two rollers.

8. An apparatus as set forth in claim 7, wherein said means for quenching includes a plurality of blowers which are pivotally mounted relative to each other below said rollers along with said support members.

9. A glass bending and tempering apparatus comprising:
   a bending and tempering section having an upstream end for receiving a heated glass sheet and a downstream end for exiting a bent glass sheet;
   a deformable glass support means disposed substantially horizontally between said upstream and downstream ends of said bending and tempering section, said support means being fixed at a center location of said upstream end of said bending and tempering section and a center location of said downstream end of said bending and tempering section, said centers of location being substantially fixed in a vertical direction, said support means being deformable from a substantially flat configuration to a configuration having a desired curvature, said support means remaining substantially fixed at said centers of location of said upstream and downstream ends during deformation;

means for quenching a glass sheet in said bending and tempering section, said means for quenching being conformable to a curvature of said support means during deformation of said support means; and, means for blowing air disposed above said support means that is deformable into a configuration that conforms with the curvature of said support means, said means for blowing air including a plurality of first blowers for blowing hot air and a plurality of second blowers positioned between each of said first blowers for blowing cooling air, said first and second blowers being movable relative to each other during deformation of said means for blowing air.

10. A glass bending and tempering apparatus comprising:

a bending and tempering section having an upstream end for receiving a heated glass sheet and a downstream end for exiting a bent glass sheet;

a deformable glass support means disposed substantially horizontally between said upstream end and said downstream end of said bending and tempering section, said support means being fixed at a center location of said upstream end of said bending and tempering section, said center location being substantially fixed in a vertical direction, said support means being deformable from a substantially flat configuration to a configuration having a desired curvature, said support means remaining substantially fixed at said center location of said upstream end during deformation;

means for quenching a glass sheet in said bending and tempering section, said means for quenching being conformable to a curvature of said support means during deformation of said support means; and, means for blowing air disposed above said support means that is deformable into a configuration that conforms with the curvature of said support means, said means for blowing being mounted so as to be vertically movable relative to said support means such that said means for blowing is spaced in close proximity to said support means in a lowered position during bending of said glass sheet and said means for blowing is displaced from said support means in a raised position.

11. A method of bending and tempering a glass sheet, comprising the steps of:

heating a glass sheet for bending and tempering;

transporting said heated glass sheet to a deformable glass support means situated within a bending and tempering section such that said heated glass sheet is positioned between an upstream end and a downstream end of said bending and tempering section;

retaining said deformable glass support means in a substantially fixed manner in a vertical direction at a center location of said upstream end and a center location of said downstream end;

lowering a means for blowing air into close proximity to said support means;

deforming said support means from a substantially flat configuration such that a portion of said support means is moved relative to said center locations of said upstream and downstream ends while exposing an upper surface of the glass sheet to pressurized hot air from said means for blowing air to curve said glass sheet;

quenching said curved glass sheet with cooling air from a plurality of outlet means;

moving said plurality of outlet means so as to be generally conformable to a curvature of said support means during deformation of said support means; and, raising said means for blowing air from said support means.

12. A method as set forth in claim 11, further comprising the step of oscillating said glass sheet during said curving.

13. A method as set forth in claim 12, further comprising the step of stopping said curving of said glass sheet while continuing to oscillate said glass sheet.

14. A method as set forth in claim 13, further comprising the step of returning said support means from a deformed configuration to a substantially flat configuration before carrying said curved glass sheet out of said bending and tempering section.

15. A method as set forth in claim 11, wherein said hot air blowing is also used to maintain a glass sheet temperature substantially constant during said curving.

16. A method as set forth in claim 11, wherein said step of deforming said support means provides curving of said glass sheet around an axis of curvature transverse to a transporting direction of said glass sheet.

17. A method of bending and tempering a glass sheet, comprising the steps of:

heating a glass sheet for bending and tempering;

transporting said heated glass sheet to a deformable glass support means situated within a bending and tempering section such that said heated glass sheet is positioned between an upstream end and a downstream end of said bending and tempering section;

retaining said deformable glass support means in a substantially fixed manner in a vertical direction at a center location of said upstream end and a center location of said downstream end;

deforming said support means such that a portion of said support means is moved relative to said center locations of said upstream and downstream ends to curve said glass sheet around an axis of curvature transverse to a traveling direction of said glass sheet, said support means deforming such that a radius of curvature of said support means is decreased at a substantially constant rate until a desired final radius of curvature is reached, said radius of curvature being substantially constant at any given instant of time, exposing an upper surface of said glass sheet to gaseous pressure so that said glass sheet follows a curvature of said support means;

quenching said glass sheet with cooling air from outlets; and, moving said outlets so as to be generally conformable to a curvature of said support means during deformation of said support means.

18. A method as set forth in claim 17, wherein a tangent of a mid-portion of said support means is maintained substantially in a horizontal plane.

19. A glass bending and tempering apparatus comprising:

a bending and tempering section having an upstream end for receiving a heated glass sheet and a downstream end for exiting a bent glass sheet;

a deformable glass support means disposed substantially horizontally within said bending and tempering section and being substantially fixed in a vertical direction at outermost corners of both said upstream end and said downstream end;

means for quenching a glass sheet in said bending and tempering section, said means for quenching being conformable to a curvature of said support means during deformation of said support means; and, means for blowing air disposed above said support means that is deformable into a configuration that conforms with the curvature of said support means, said means for blowing being mounted so as to be vertically movable relative to said support means such that said means for blowing is spaced in close proximity to said support means in a lowered position during bending of said glass sheet and said means for blowing is displaced from said support means in a raised position.

* * * * *